(12) United States Patent
Williamson et al.

(10) Patent No.: US 7,427,106 B2
(45) Date of Patent: Sep. 23, 2008

(54) CURVED PROFILE TRACKING PLATFORM FOR A PASSENGER SEAT

(75) Inventors: John Williamson, Davie, FL (US); Pawan Gaikwad, Miami, FL (US)

(73) Assignee: B/E Aerospace, Inc., Wellington, FL (US)

( * ) Notice: Subject to any disclaimer, the term of this patent is extended or adjusted under 35 U.S.C. 154(b) by 603 days.

(21) Appl. No.: 10/944,134

(22) Filed: Sep. 17, 2004

(65) Prior Publication Data

US 2006/0103203 A1    May 18, 2006

(51) Int. Cl.
*B60N 2/00* (2006.01)
*B60N 2/12* (2006.01)

(52) U.S. Cl. .................. 297/337; 297/329; 297/354.13; 5/18.1; 5/118

(58) Field of Classification Search ............ 297/354.13, 297/337, 329; 5/118, 18.1
See application file for complete search history.

(56) References Cited

U.S. PATENT DOCUMENTS

| | | | |
|---|---|---|---|
| 2,153,763 A * | 4/1939 | Kuhler | 297/329 |
| 4,018,166 A * | 4/1977 | Gutridge et al. | 5/18.1 |
| 4,586,206 A * | 5/1986 | Singer | 5/18.1 X |
| 5,624,160 A | 4/1997 | Koch et al. | |
| 5,921,629 A | 7/1999 | Koch et al. | |
| 5,954,401 A | 9/1999 | Koch et al. | |
| 5,975,636 A | 11/1999 | Koch et al. | |
| 6,412,864 B1 | 7/2002 | Larson | |
| 6,494,536 B2 * | 12/2002 | Plant | 297/354.13 X |

OTHER PUBLICATIONS

U.S. Appl. No. 10/943,272, filed Sep. 17, 2004, Williamson et al.
U.S. Appl. No. 10/943,672, filed Sep. 17, 2004, Meneses et al.
U.S. Appl. No. 10/944,487, filed Sep. 17, 2004, Williamson et al.
U.S. Appl. No. 10/944,488, filed Sep. 17, 2004, Williamson et al.

* cited by examiner

*Primary Examiner*—Anthony D. Barfield
(74) *Attorney, Agent, or Firm*—Drinker Biddle & Reath LLP (57) ABSTRACT

A curved tracking platform that can be employed on a dynamic seat or divan such as those used in a business jet aircraft so that the seat can be comfortably used as a seat or in an extended bed position. When in the unextended seat position, the tracking platform allows the horizontal portion of the seat to support an occupant pitched back toward the vertical seat cushion at or about an angle of 6° to the horizontal. However, when the tracking platform is extended so that the seat can be used as a bed, the tracking platform travels along a curved frame rail profile which allows the platform to lay flat or substantially flat, thus allowing the vertical cushion to be placed next to the horizontal seat cushion so that they lie substantially flat to provide optimized comfort.

18 Claims, 15 Drawing Sheets

CURVED PROFILE TRACKING PLATFORM FOR A PASSENGER SEAT

CROSS-REFERENCE TO RELATED PATENT APPLICATIONS

Related subject matter is disclosed in copending U.S. patent application Ser. No. 10/944,487, filed Sep. 17, 2004, entitled ATTACHMENT ASSEMBLY FOR MOUNTING A SEAT TO THE FLOOR OF A VEHICLE; U.S. patent application Ser. No. 10/944,488, filed Sep. 17, 2004, entitled INDEPENDENT DIVAN DOOR AND DRAWER ASSEMBLY, which issued as U.S. Pat. No. 7,240,943; U.S. patent application Ser. No. 10/943,272, filed Sep. 17, 2004, entitled FLEXIBLE SEAT FRAME, which issued as U.S. Pat. No. 7,080,881; and U.S. patent application Ser. No. 10/943,672, filed Sept. 17, 2004, entitled ADJUSTABLE SEAT BELT GUIDE ASSEMBLY, which issued as U.S. Pat. No. 7,226,121.

FIELD OF THE INVENTION

The present invention relates to a curved tracking platform for use in a seat, such as a passenger seat of a vehicle, in particular, a business jet aircraft.

BACKGROUND OF THE INVENTION

Many types of business jet aircraft include seats whose seat portion can be extended so that the vertical back support cushion can be placed next to the horizontal seat cushion to enable the seat to act as a bed. Typically, the horizontal portion of the seat frame has an extendible frame portion that is attached to the stationary frame by rollers and thus can be slid into an extended position to extend the depth of the horizontal portion to accommodate the vertical portion of the seat.

One problem that is present in existing extendable seats, or divans, is that they employ a flat-tracking platform. That is, the extendable portion of the seat frame is flat. This configuration is optimal when the seat is used in the bed mode as described above because the extended portion and the stationary horizontal portion of the seat frame will be substantially even and thus the horizontal seat cushion and vertical seat cushion can lie substantially even. However, because the horizontal portion of the seat is flat, the seat is somewhat uncomfortable to a passenger when it is being used in the seat configuration. Ideally, the horizontal portion of the seat should be pitched at a slight angle so that the seat cushion is slightly angled, thus providing a more secure and comfortable seat for the passenger.

Accordingly, a need exists for an extendable seat assembly which can be comfortably used as a seat or a bed.

BRIEF SUMMARY OF THE INVENTION

The embodiment of the present invention described herein provides a curved tracking platform that can be employed on a dynamic seat or divan that can be used, for example, in a business jet aircraft so that the seat can be comfortably used as a seat or in an extended bed position. When in the unextended seat position, the tracking platform allows the horizontal portion of the seat to support an occupant pitched back toward the vertical seat cushion at or about an angle of 6° to the horizontal. However, when the tracking platform is extended so that the seat can be used as a bed, the tracking platform travels along a curved frame rail profile which allows the platform to lay flat or substantially flat, thus allowing the vertical cushion to be placed next to the horizontal seat cushion so that they lie substantially flat to provide optimized comfort.

The seat includes, in particular, a stationary frame and a curved tracking platform. The stationary frame has an upright portion and a substantially horizontal portion, the substantially horizontal portion having a plurality of curved rails opposing each other. The curved tracking platform is adapted to move along the curved rails between a retracted position wherein the curved tracking platform is positioned over the substantially horizontal portion of the stationary frame and an extended position where the curved tracking platform extends beyond the substantially horizontal portion of the stationary frame. The seat further includes a horizontal seat cushion that can rest on the curved tracking platform when the curved tracking platform is in the retracted position, such that the curved tracking platform pitches the horizontal seat cushion at an angle of about 6° to the horizontal. The seat also includes a vertical seat cushion which can be positioned substantially vertical and proximate to the upright portion of the stationary frame the curved tracking platform is in the retracted position, and can be positioned over the substantially horizontal portion of the stationary frame when the curved tracking platform is in the extended position. The horizontal seat cushion can thus rest on the curved tracking platform when the curved tracking platform is in the extended position.

The seat further includes at least one roller mechanism, coupled to each of the curved rails, such that the curved tracking platform passes along the roller mechanism when moving between the retracted and extended positions. Each roller mechanism includes a plurality of rollers, positioned such that the curved tracking platform passes along each of the rollers when moving between the retracted and extended positions. One of the rollers is positioned to rotate about a first axis and the other of the rollers is positioned to rotate about a second axis that can be substantially parallel to the first axis. It is noted that the curved tracking platform includes a plurality of curved members on opposite sides of the curved tracking platform, and each positioned to engage with the rollers of a roller mechanism. Specifically, each curved member has a recess therein, such that one of the rollers is received into the recess and the other roller is adapted to contact a flange of the curved member defining the recess.

The seat also includes at least one locking mechanism for releasably locking the curved tracking platform to prevent the curved tracking platform from moving along the curved rails. The locking mechanism includes a roller, positioned such that the curved tracking platform passes along the roller when moving between the retracted and extended positions. The locking mechanism also includes a pin which releasably engages an opening in the curved tracking platform when the curved tracking platform is moved to a position at which the opening aligns with the pin. A biasing member, such as a spring, biases the pin in a direction toward the curved tracking platform.

BRIEF DESCRIPTION OF THE DRAWINGS

These and other advantages and novel features of the invention will be more readily appreciated from the following detailed description when read in conjunction with the accompanying drawings, in which.

DETAILED DESCRIPTION OF THE PREFERRED EMBODIMENTS

Figure 1:
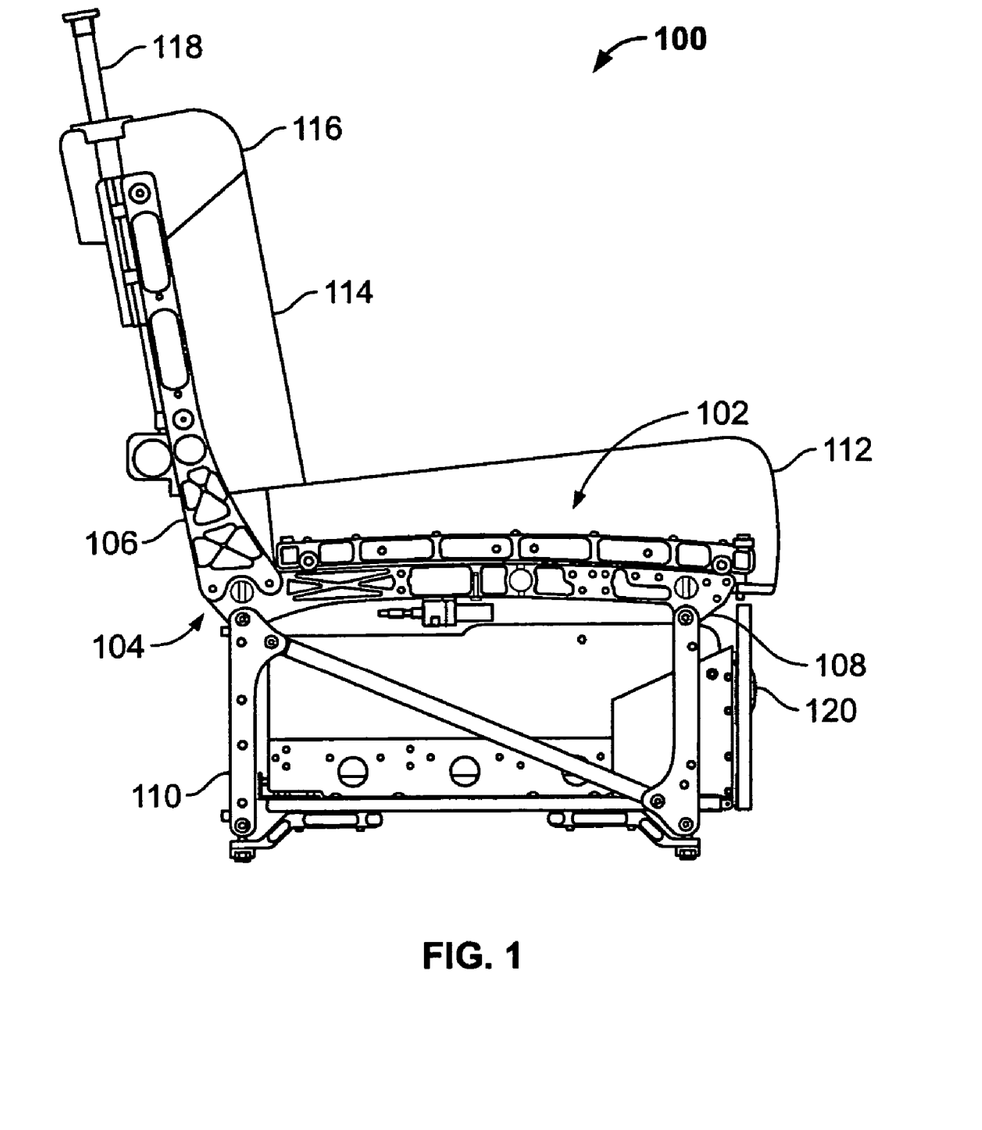
FIG. 1 is a schematic side view of a seat assembly in an upright position employing a curved tracking platform according to an embodiment of the present invention.

FIG. 1 is a schematic side view of a seat assembly 100 employing a curved profile tracking platform 102 according to an embodiment of the present invention. As illustrated, the seating assembly 100 includes a frame assembly 104 having an upright portion 106, a horizontal portion 108, and leg portions 110 that are mountable to a surface, such as to the floor of a dwelling or to the floor of the passenger vehicle, in particular, a business jet aircraft. The seat assembly also includes a horizontal seat cushion 112, a vertical seat cushion 114, and a headrest seat cushion 116. The seat assembly 100 also includes a seat belt assembly 118 that is described in more detail in co-pending U.S. patent application Ser. No. 10/943,672, entitled Adjustable Seat Belt Guide Assembly, the entire content of which is incorporated herein by reference. As further illustrated, the seat 100 can include a drawer assembly 120 that is positioned underneath the horizontal frame portion 108 as described in more detail in co-pending U.S. patent application Ser. No. 10/944,488, entitled Independent Divan Door and Drawer Assembly, the entire content of which is incorporated herein by reference.

Figure 2:
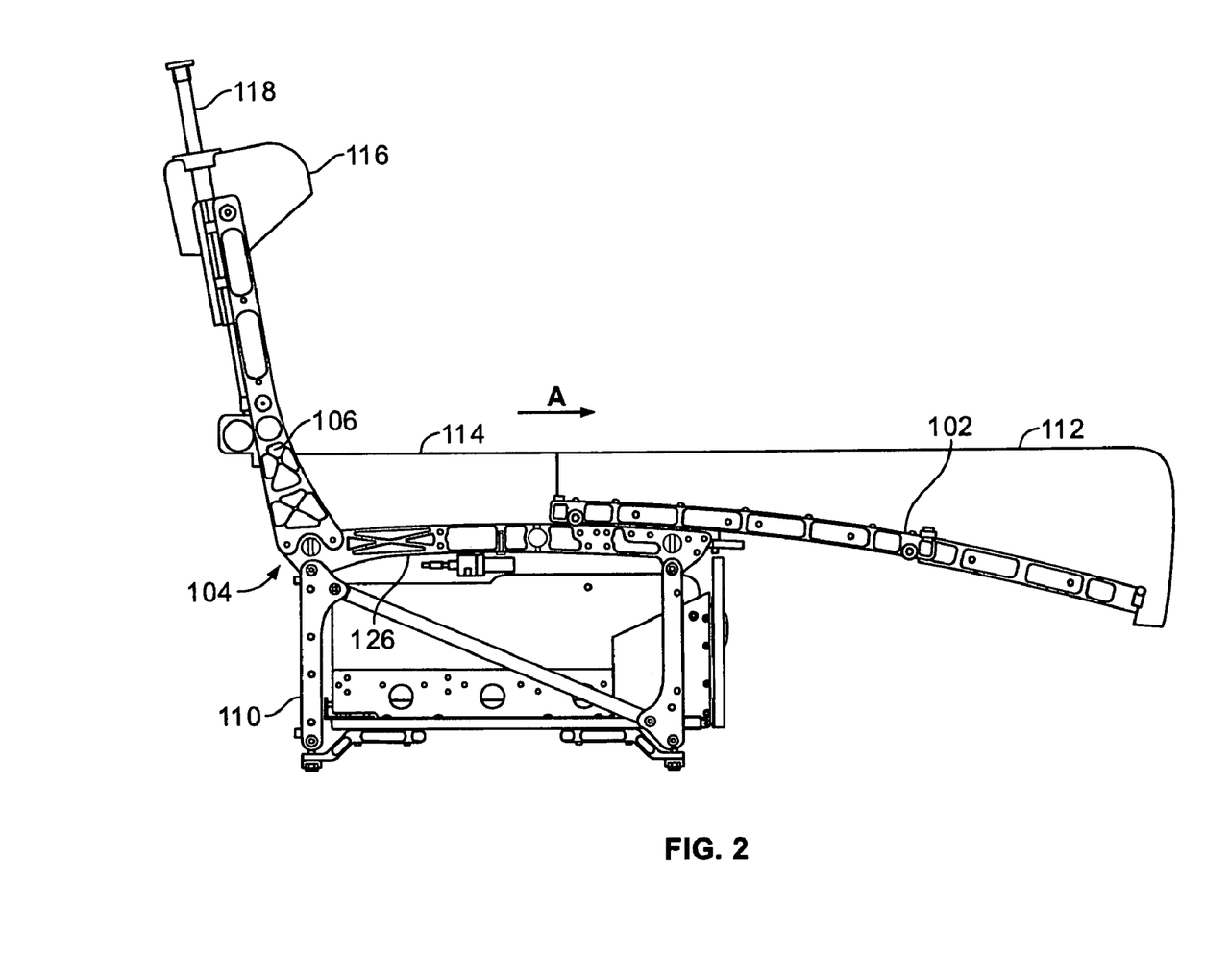
FIG. 2 is a schematic side view of the seating assembly shown in FIG. 1 in which the curved profile tracking platform has been deployed so that the seat is in the bed position.
Figure 3:
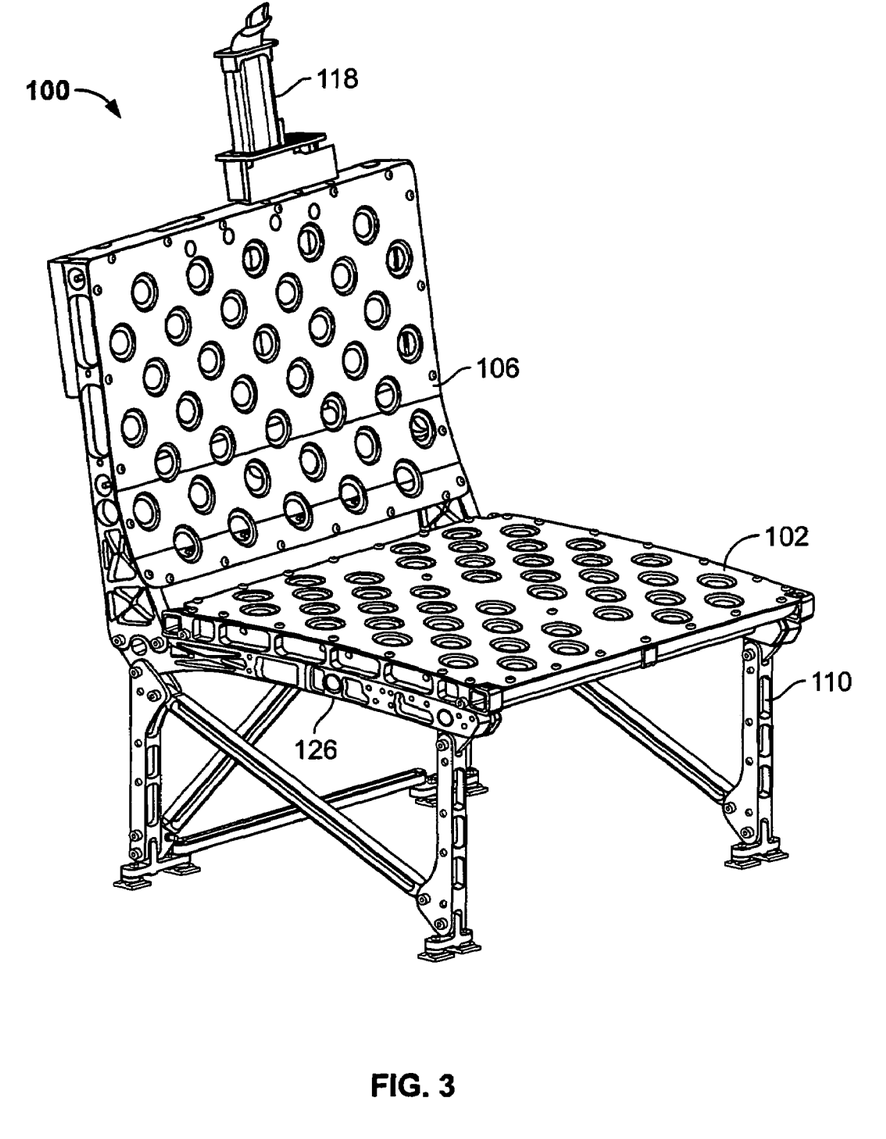
FIG. 3 is a front perspective view of an example of the frame of the seat assembly as shown in FIG. 1.
Figure 5:
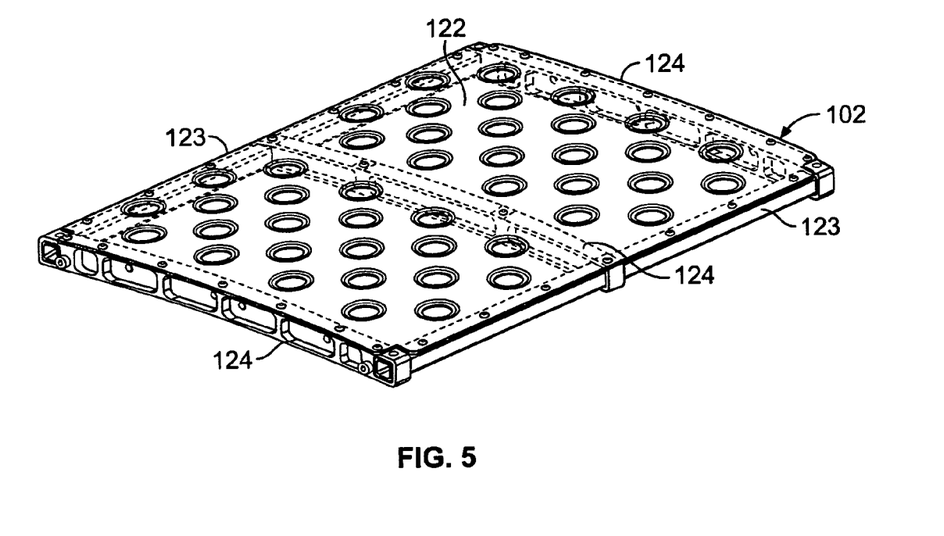
FIG. 5 is a perspective view of the curved platform according to an embodiment of the present invention as employed in the seat assembly as shown in FIG. 1.
Figure 6:
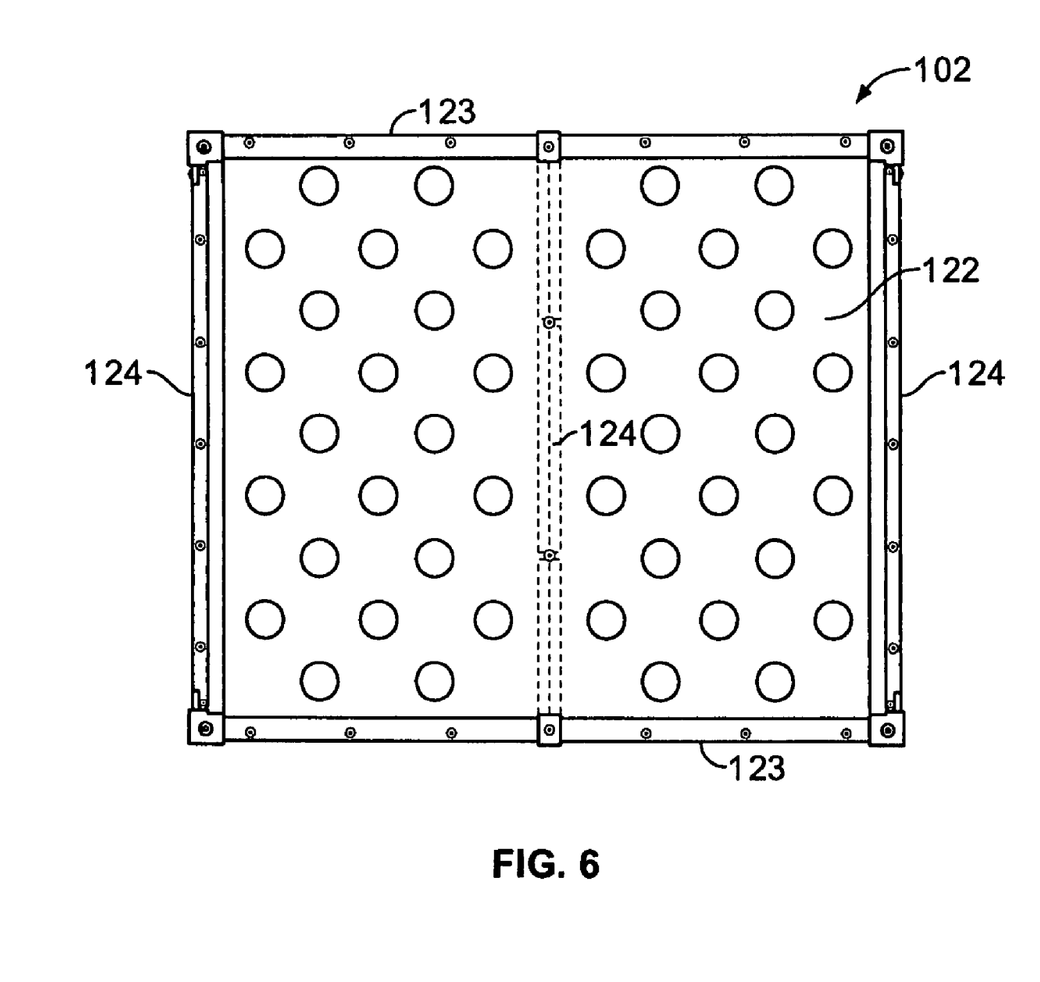
FIG. 6 is a top view of the curved platform as shown in FIG. 5.
Figure 7:
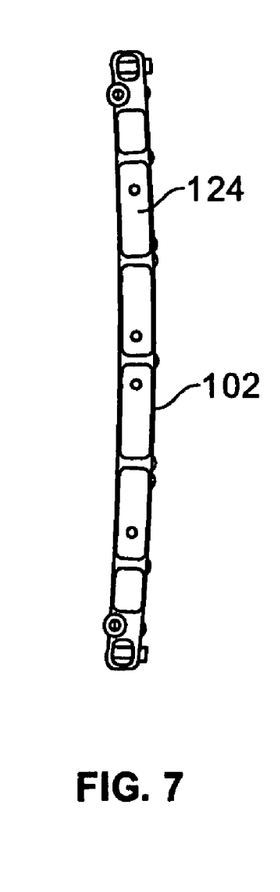
FIG. 7 is a side view of the curved platform as shown in FIG. 5.

As illustrated in FIG. 2, the curved tracking platform 102 can be moved in a direction indicated by arrow A to an extended position as described in more detail below, so that the vertical seat cushion 114 can be laid next to the horizontal seat cushion 112. Hence, when multiple adjacent seats are arranged in this position, the row of seats can act as a bed for the passenger. Further details of the curved tracking platform will now be described with reference to FIGS. 5-7.

Figure 4:
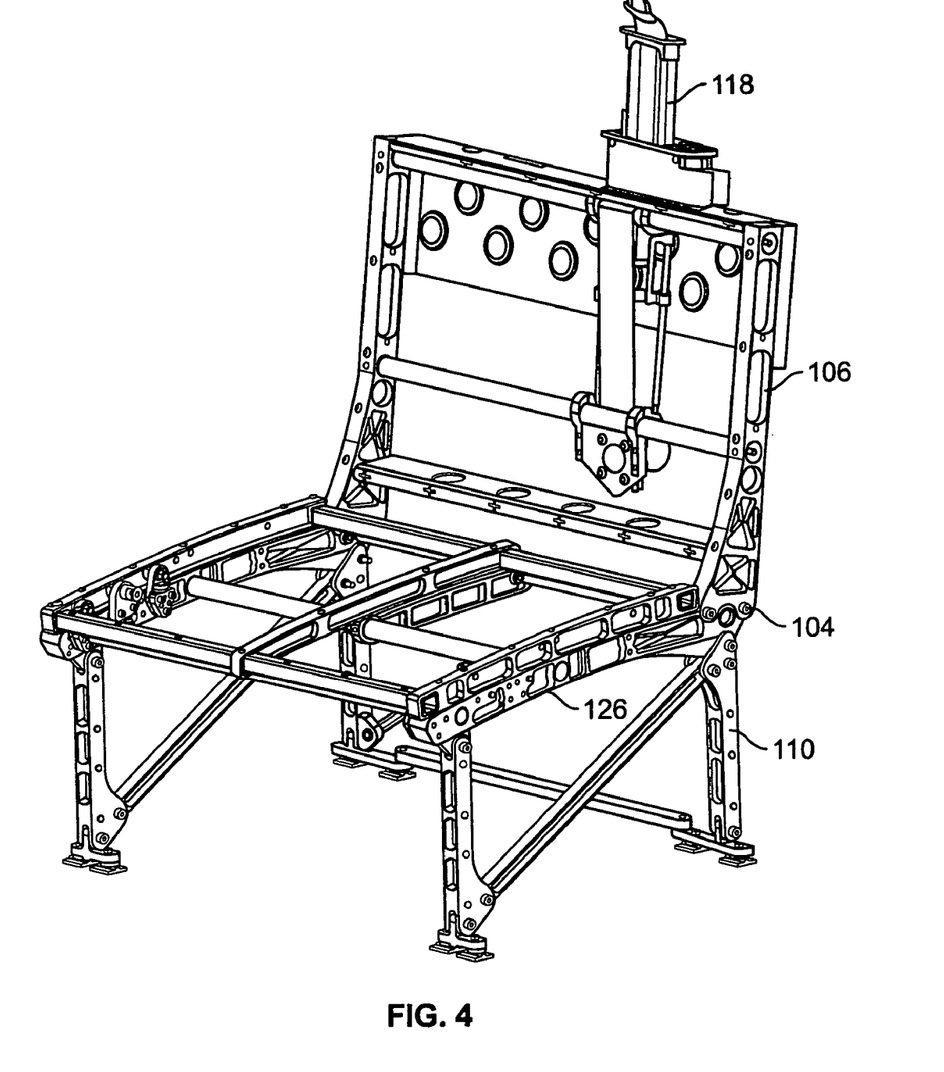
FIG. 4 is another front perspective view of the frame of the seat assembly as shown in FIG. 1 having the tracking platform removed.
Figure 8:
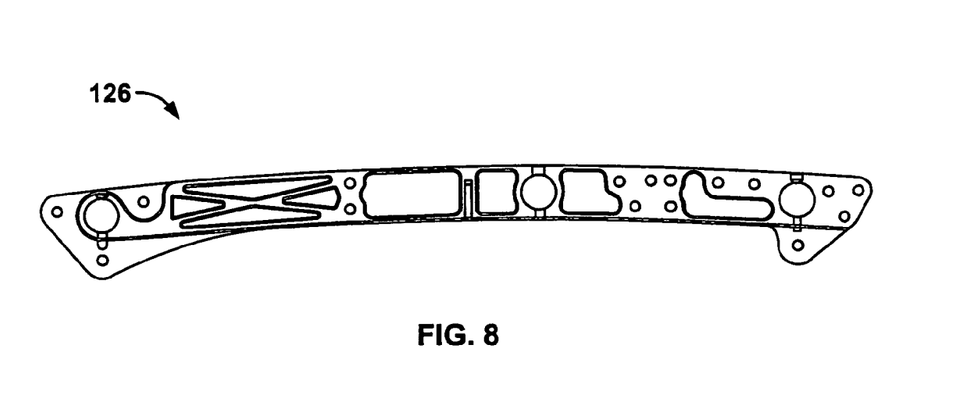
FIG. 8 is a side view of the curved frame rail of the seat assembly as shown in FIG. 1.
Figure 9:
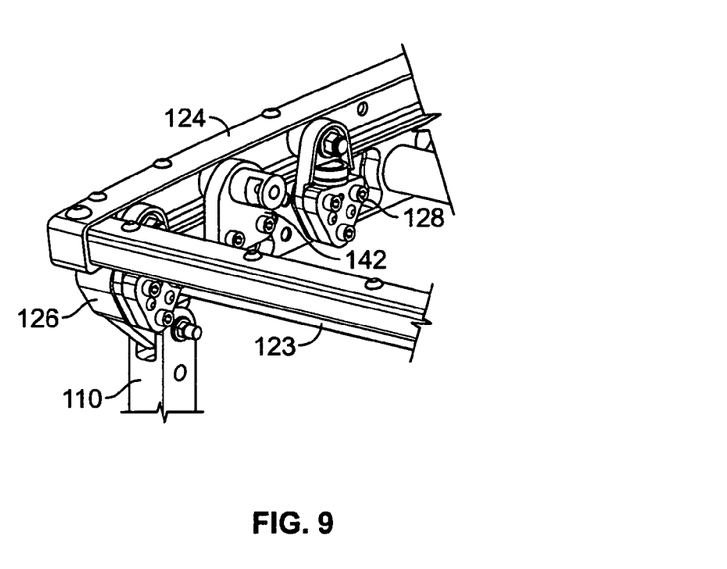
FIG. 9 is a detailed perspective view of the roller mechanism about which the curved platform shown in FIG. 5 travels, and the locking mechanism, according to an embodiment of the present invention.
Figure 10:
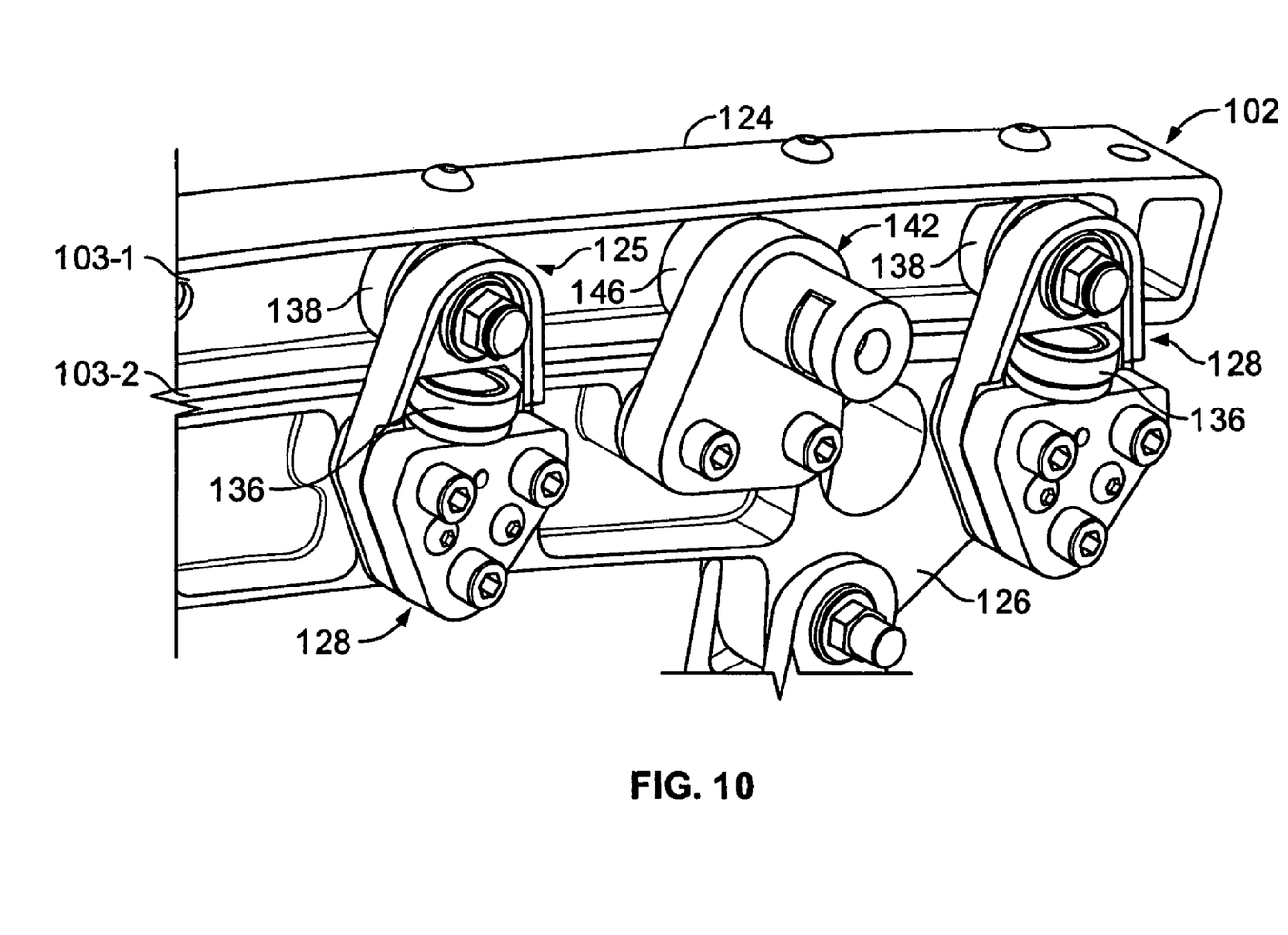
FIG. 10 is another detailed perspective view of the roller mechanism as shown in FIG. 9 positioned on the curved frame rail of the seat assembly opposite to the curved frame rails shown in FIG. 9.

As indicated, the curved tracking platform 102 is formed of metal plate 122, brackets 123 and curved members 124 that are mounted together by screws, rivets or any other suitable fastening member. As indicated, the platform 102 has a curvature that enables the horizontal seat cushion 112 to rest at an angle of at or about 6° with respect to the horizontal when the seat 100 is in the upright position as shown in FIG. 1. As shown in detail in FIG. 8, the horizontal frame portion 108 include a plurality of computer numerically controlled (CNC) machined curved rails 126 that arranged parallel or substantially parallel to each other on opposite sides of the horizontal frame portion 108 as shown, in particular, in FIG. 4. As indicated in FIGS. 9 and 10, a plurality of roller mechanisms 128 are attached to each of the curved rails 126. Details of the roller mechanisms are shown in FIGS. 9-15. Specifically, the roller mechanism 128 includes a bracket portion 130 and a roller-securing portion 132, pin 133 and screws 134 that, along with pin member 135, rotatably secure roller 136 to the bracket assembly 130. The other roller 138 is secured by a screw member 139, washer 140, and nut 141. Rollers 136 and 138 can be made of rubber, plastic, polyurethane, metal or any other suitable material. The roller 138 can thus rotate about an axis that is perpendicular or substantially perpendicular to the axis about which roller 136 rotates. The curved platform 102 travels along the rollers 136 and 138 of the roller mechanism 128 to move between the retracted position as shown in FIG. 1 to the extended position as shown in FIG. 2.

Figure 11:
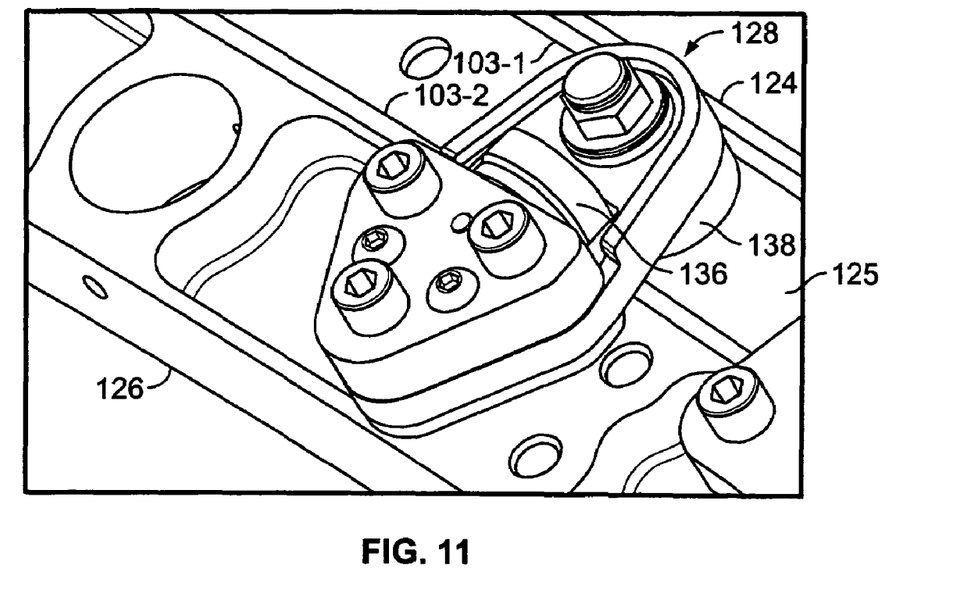
FIG. 11 is a further detailed perspective view of the roller mechanism shown in FIGS. 9 and 10.
Figure 12:
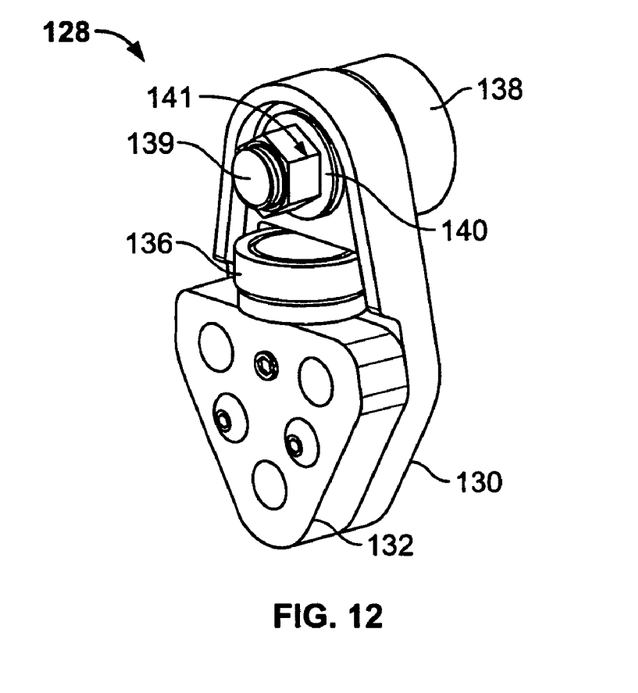
FIG. 12 is a further detailed perspective view of the roller mechanism shown in FIGS. 9 and 10 and removed from the curved rail.
Figure 13:
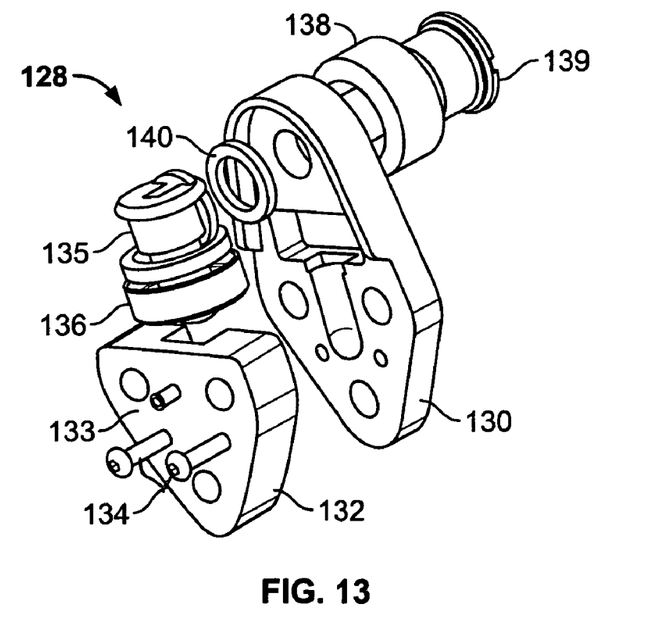
FIG. 13 is a exploded perspective view of the roller mechanism shown in FIGS. 9 and 10.
Figure 14:
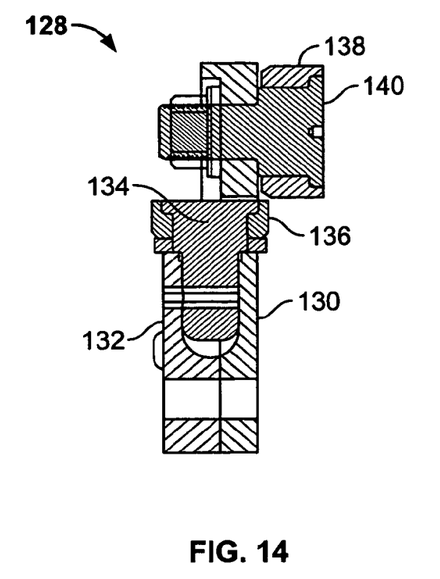
FIG. 14 is a cross-sectional view of the roller mechanism shown in FIGS. 9 and 10.
Figure 15:
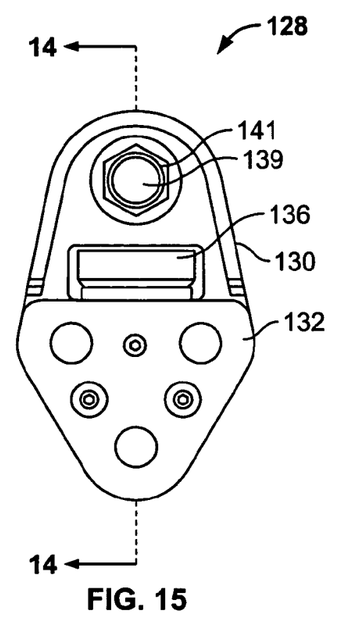
FIG. 15 is a front view of the roller mechanism shown in FIGS. 9 and 10.
Figure 16:
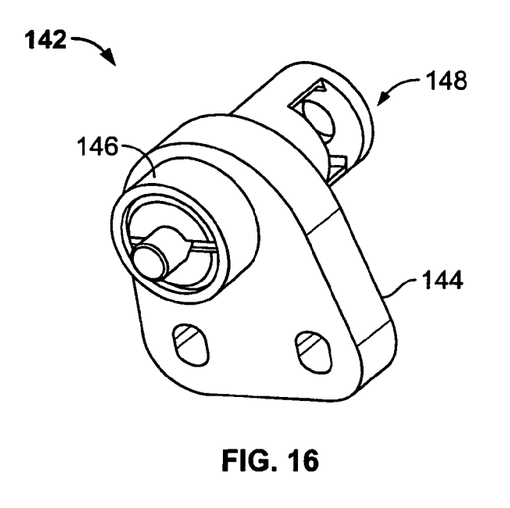
FIG. 16 is another detailed perspective view of the locking mechanism as shown in FIGS. 9 and 10 and removed from the curved rail.

That is, as shown in detail in FIGS. 10 and 11, the roller 138 of each roller mechanism 128 is received into a recess 125 of a corresponding curved member 124 of curved tracking platform 102 and thus the inner surfaces of upper and lower flanges 103-1 and 103-2 of the curved member 124 travel along the roller 138 as the curved tracking platform 102 is moved along the direction indicated by arrow A in FIG. 2. The outer surface of flange 103-2 is guided along roller 136 of the roller mechanism 128 as indicated so that roller 136 prevents lateral movement of the curved tracking platform 102, that is, movement in a direction transverse to arrow A shown in FIG. 2. Accordingly, the roller mechanism 128 enables the curved tracking platform 102 to be moved smoothly and with ease between the retracted position as shown in FIG. 1 to the extended position as shown in FIG. 2.

As further shown in FIG. 9, at least one locking mechanism 142 is coupled to at least one of the rails 126. As shown in more detail in FIGS. 16-22, the locking mechanism 142 includes a bracket portion 144, a roller 146, and a roller mounting mechanism 148 for mounting the roller 146 to the bracket portion 144. Roller 146 can be made of rubber, plastic, polyurethane, metal or any other suitable material. The axis about which roller 146 rotates can be parallel or substantially parallel to the axis about which roller 138 rotates, and thus perpendicular or substantially perpendicular to the axis about which roller 136 rotates.

Figure 17:
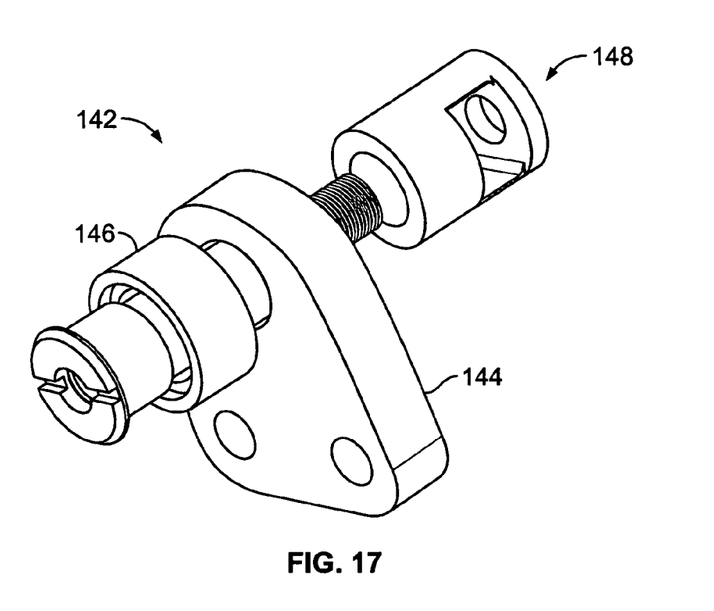
FIG. 17 is an exploded perspective view of the locking mechanism as shown in FIG. 16.
Figure 18:
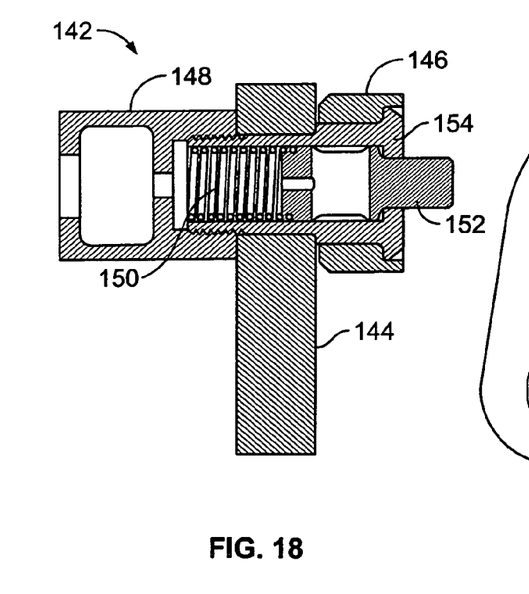
FIG. 18 is a cross-sectional view of the locking mechanism as shown in FIG. 16.
Figure 19:
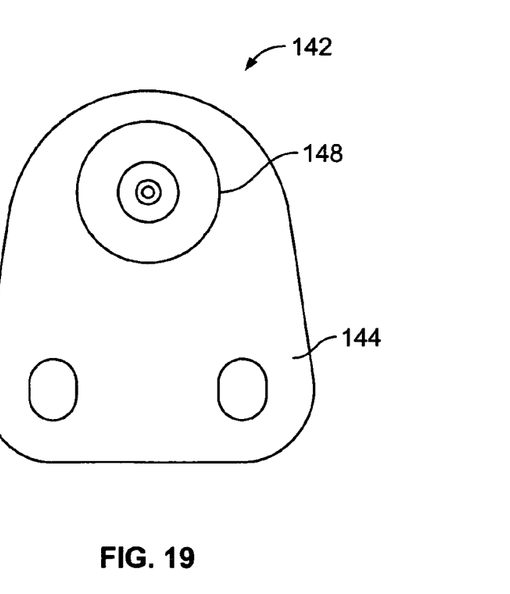
FIG. 19 is a front view of the locking mechanism shown in FIG. 16.
Figure 20:
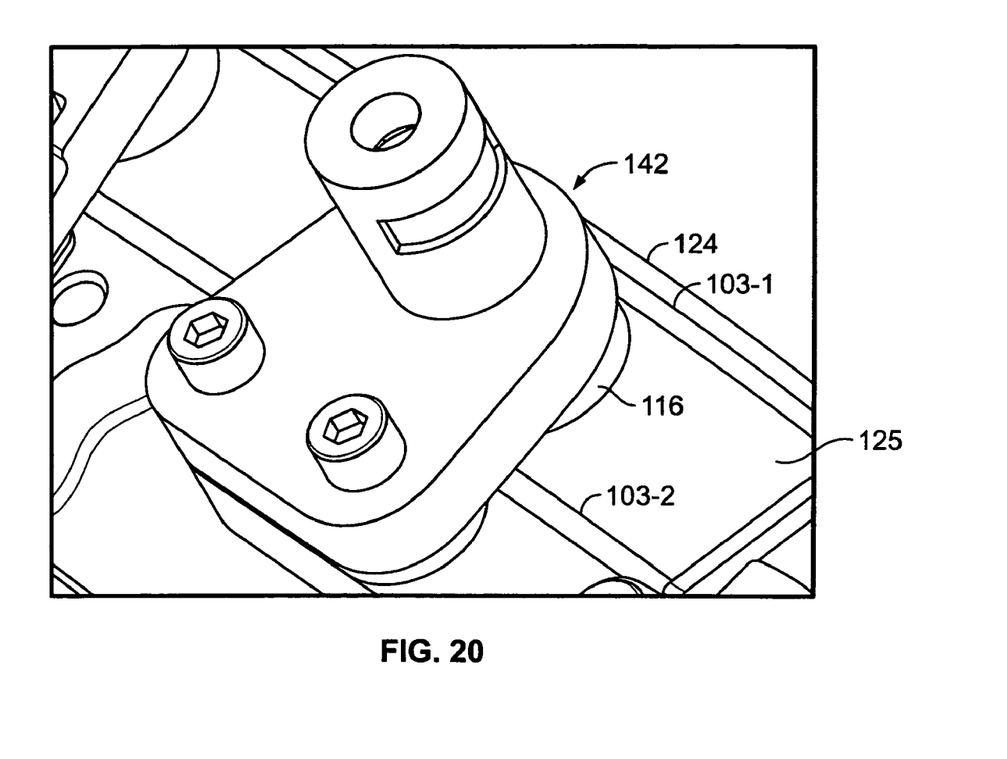
FIG. 20 is a further detailed perspective view of the locking mechanism as shown in FIG. 16.
Figure 21:
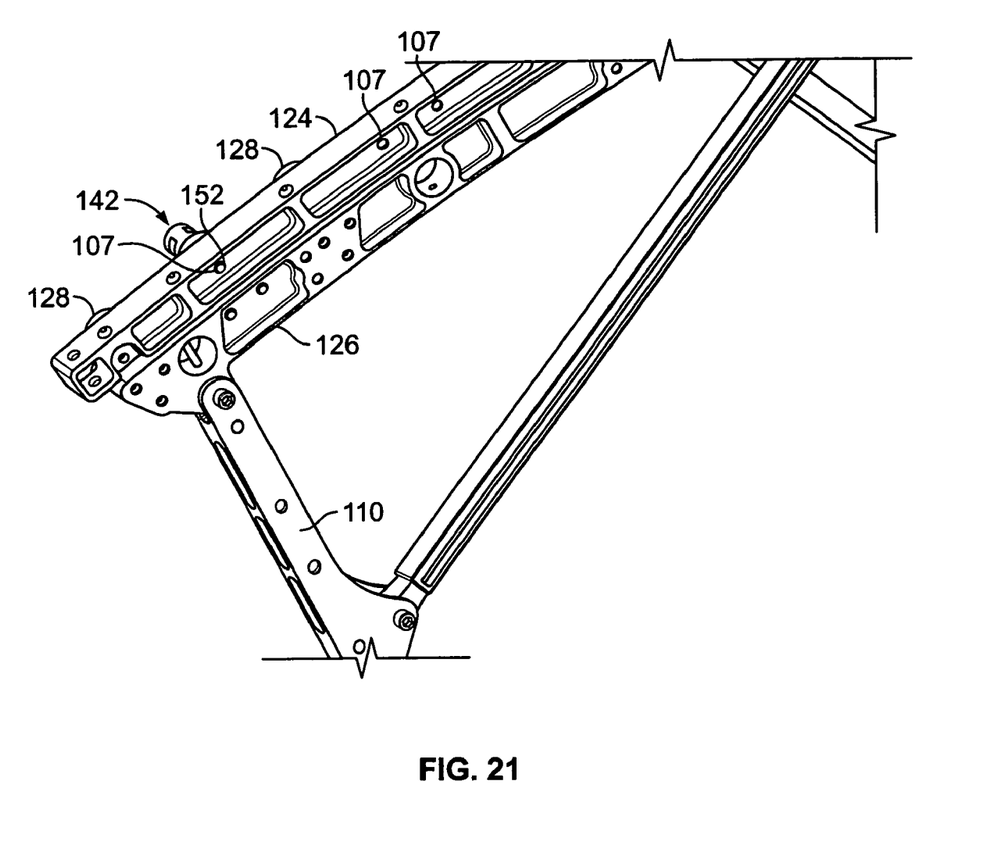
FIG. 21 is a perspective view illustrating an example of how the pin of the locking mechanism shown in FIG. 16 engages with the curved rail.
Figure 22:
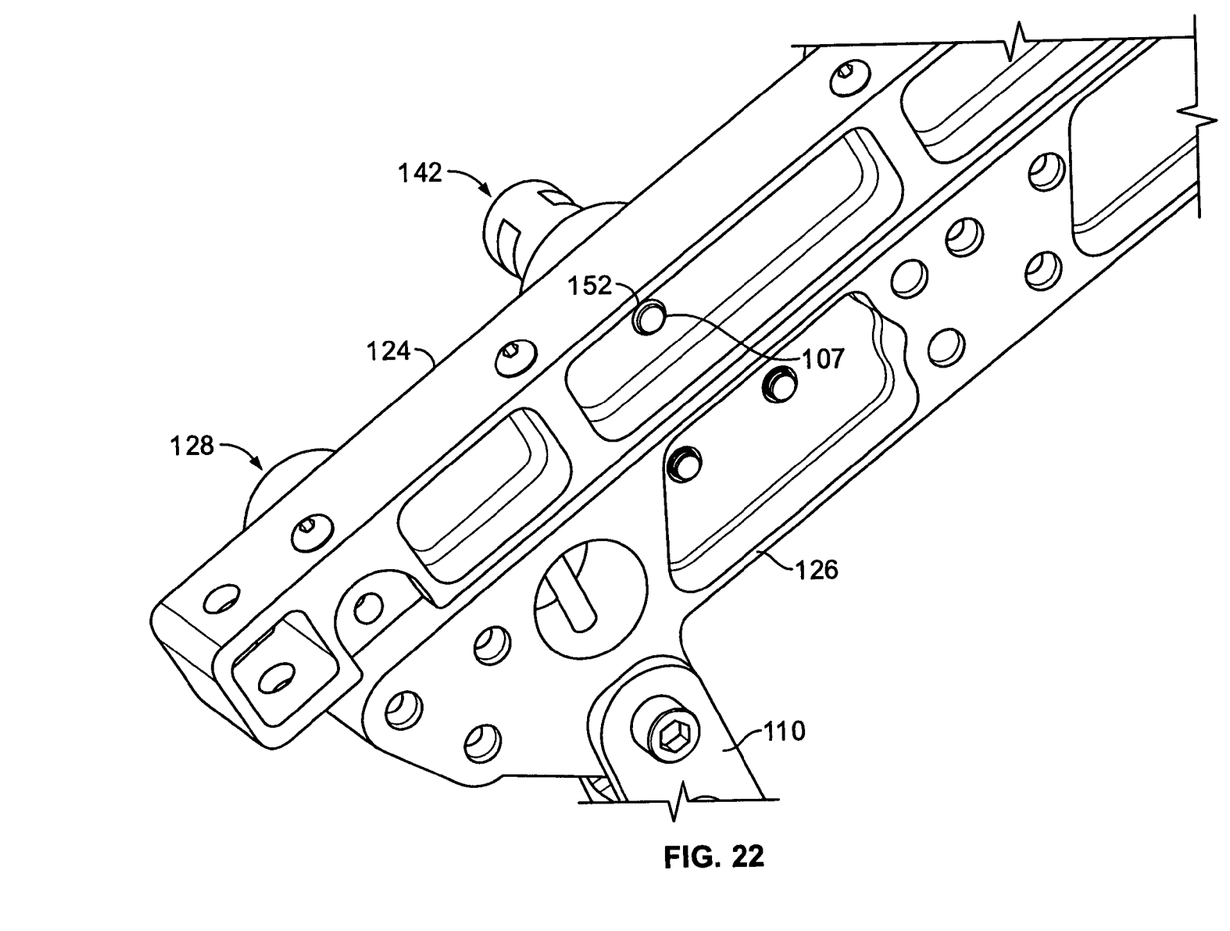
FIG. 22 is an enlarged view of the portion of FIG. 21 showing engagement of the pin of the locking mechanism with the curved rail.

As further shown in FIGS. 17 and 18, the roller mounting mechanism 148 includes a spring 150 and a pin 152 that is held into the roller mounting mechanism 148 by a retaining mechanism 154 that screws into an opening in the roller mounting mechanism 148. As indicated, the spring 150 biases the pin 152 to a position where pin 152 extends beyond the outer surface of pin retaining mechanism 154. Therefore, as shown in FIGS. 21 and 22, when the curved tracking platform 102 is moved along and guided by rollers 136 and 138 of roller mechanism 128 and roller 146 of locking mechanism 142, and an opening 107 reaches the position of pin 152, the spring 150 will force the pin 152 into opening 107 and thus releasably lock the curved tracking platform 102 at that position.

The curved tracking platform 102 can then be further pulled in the direction of arrow A as shown in FIG. 2, or pushed in a direction opposite to arrow A, which will result in the pin 152 disengaging from the opening 107 and thus become depressed by the curved tracking platform 102 against the force of spring 150 into the pin retaining mechanism 154. This will allow the curved tracking platform 102 to be further moved in the direction of arrow A or opposite to direction of arrow A, as desired. Alternatively, a user can manually depress the pins 152 of the locking mechanisms 142 if the force exerted in the direction of arrow A or opposite to arrow A is insufficient to disengage the pins 152 from openings 107. When the curved tracking platform 102 reaches another position where another opening 107 becomes aligned with pin 152, the spring 150 will force pin 152 into opening 107 and thus releasably lock the curved tracking platform 102 at that new position. The curved tracking platform 102 can then again be disengaged from the pin 152 by applying additional pulling or pushing force in the direction of arrow A or opposite to the direction of arrow A as shown in FIG. 2 to further move the curved tracking platform 102 as desired.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A seat comprising:
a stationary frame having an upright portion and a substantially horizontal portion, the substantially horizontal portion having a plurality of curved rails opposing each other;
a curved tracking platform, adapted to move along the curved rails between a retracted position wherein the curved tracking platform is positioned over the substantially horizontal portion of the stationary frame and an extended position where the curved tracking platform extends beyond the substantially horizontal portion of the stationary frame; and
at least one roller mechanism including a plurality of rollers, coupled to each of the curved rails, such that the curved tracking platform passes along each of the rollers when moving between the retracted and extended positions.

2. A seat as claimed in claim 1, further comprising:
a horizontal seat cushion, adapted to rest on the curved tracking platform when the curved tracking platform is in the retracted position, such that the curved tracking platform pitches the horizontal seat cushion at an angle of about 6° to the horizontal.

3. A seat as claimed in claim 2, further comprising:
a vertical seat cushion, adapted to be positioned substantially vertical and proximate to the upright portion of the stationary frame the curved tracking platform is in the retracted position, and adapted to be positioned over the substantially horizontal portion of the stationary frame when the curved tracking platform is in the extended position; and
the horizontal seat cushion is farther adapted to rest on the curved tracking platform when the curved tracking platform is in the extended position.

4. A seat as claimed in claim 1, further comprising:
a plurality of said roller mechanisms coupled to each of the curved rails.

5. A seat as claimed in claim 1, further comprising:
at least one locking mechanism, adapted to releasably lock the curved tracking platform to prevent the curved tracking platform from moving along the curved rails.

6. A seat as claimed in claim 1, further comprising:
at least one roller mechanism, coupled to each of the curved rails, such that the curved tracking platform passes along the roller mechanism when moving between the retracted and extended positions; and
at least one locking mechanism, adapted to releasably lock the curved tracking platform to prevent the curved tracking platform from moving along the curved rails.

7. A seat as claimed in claim 1, wherein:
the stationary frame is adapted to mount in a vehicle.

8. A seat comprising:
a stationary frame having an upright portion and a substantially horizontal portion, the substantially horizontal portion having a plurality of curved rails opposing each other;
a curved tracking platform, adapted to move along the curved rails between a retracted position wherein the curved tracking platform is positioned over the substantially horizontal portion of the stationary frame and an extended position where the curved tracking platform extends beyond the substantially horizontal portion of the stationary frame; and
at least one roller mechanism, coupled to each of the curved rails, such that the curved tracking platform passes along the roller mechanism when moving between the retracted and extended positions, said at least one roller mechanism including a plurality of rollers, positioned such that the curved tracking platform passes along each of the rollers when moving between the retracted and extended positions, and one of the rollers is positioned to rotate about a first axis and the other of the rollers is positioned to rotate about a second axis transverse to the first axis.

9. A seat as claimed in claim 8, wherein:
the first axis is substantially perpendicular to the second axis.

10. A seat as claimed in claim 8, wherein:
the curved tracking platform includes a plurality of curved members on opposite sides of the curved tracking platform, and each positioned to engage with the rollers of a roller mechanism.

11. A seat as claimed in claim 10, wherein:
each curved member has a recess therein, such that one of the rollers is received into the recess and the other roller is adapted to contact a flange of the curved member defining the recess.

12. A seat as claimed in claim 10, wherein:
the vehicle is a jet aircraft, and the stationary frame is adapted to mount to the floor of the jet aircraft.

13. A seat comprising:
a stationary frame having an upright portion and a substantially horizontal portion, the substantially horizontal portion having a plurality of curved rails opposing each other;
a curved tracking platform, adapted to move along the curved rails between a retracted position wherein the curved tracking platform is positioned over the substantially horizontal portion of the stationary frame and an extended position where the curved tracking platform extends beyond the substantially horizontal portion of the stationary frame; and
at least one locking mechanism, adapted to releasably lock the curved tracking platform to prevent the curved tracking platform from moving along the curved rails wherein the locking mechanism includes a roller, positioned such that the curved tracking platform passes along the roller when moving between the retracted and extended positions.

14. A seat comprising:
a stationary frame having an upright portion and a substantially horizontal portion, the substantially horizontal portion having a plurality of curved rails opposing each other;
a curved tracking platform, adapted to move along the curved rails between a retracted position wherein the curved tracking platform is positioned over the substantially horizontal portion of the stationary frame and an extended position where the curved tracking platform extends beyond the substantially horizontal portion of the stationary frame; and
at least one locking mechanism, adapted to releasably lock the curved tracking platform to prevent the curved tracking platform from moving along the curved rails wherein the locking mechanism includes a pin, adapted to releasably engage an opening in the curved tracking platform when the curved tracking platform is moved to a position at which the opening aligns with the pin.

15. A seat as claimed in claim 14, wherein:
the locking mechanism further includes a biasing member, adapted to bias the pin in a direction toward the curved tracking platform.

16. A seat comprising:
a stationary frame having an upright portion and a substantially horizontal portion, the substantially horizontal portion having a plurality of curved rails opposing each other;
a curved tracking platform, adapted to move along the curved rails between a retracted position wherein the curved tracking platform is positioned over the substantially horizontal portion of the stationary frame and an extended position where the curved tracking platform extends beyond the substantially horizontal portion of the stationary frame;
at least one locking mechanism, adapted to releasably lock the curved tracking platform to prevent the curved tracking platform from moving along the curved rails; and
a plurality of said locking mechanisms, each positioned on one of the curved rails.

17. A seat as claimed in claim 16, wherein:
each locking mechanism includes a roller, positioned such that the curved tracking platform passes along the roller when moving between the retracted and extended positions; and
the curved tracking platform includes a plurality of curved members on opposite sides of the curved tracking platform, and each positioned to engage the roller of a roller mechanism.

18. A seat as claimed in claim 17, wherein:
each curved member has a recess therein, such that the roller is received into the recess.

\* \* \* \* \*